Dec. 26, 1961 D. D. CARROLL 3,014,309
ANIMATED STUFFED ANIMAL
Filed Oct. 7, 1959 3 Sheets-Sheet 1

INVENTOR.
DAVID D. CARROLL
BY
ATTORNEYS

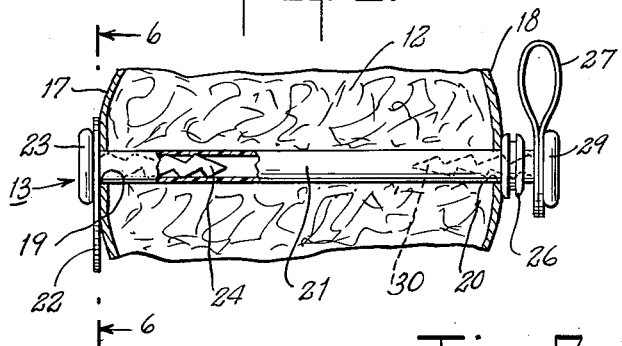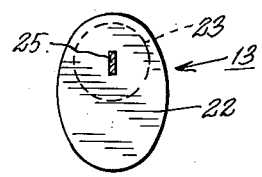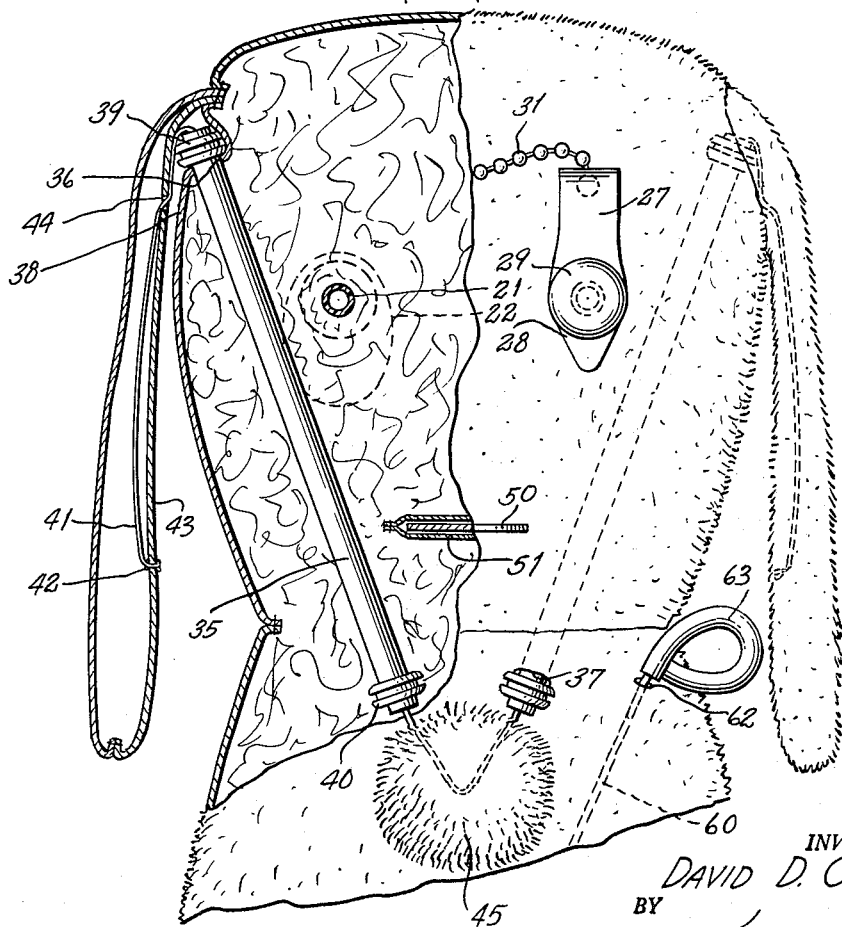

Dec. 26, 1961 D. D. CARROLL 3,014,309
ANIMATED STUFFED ANIMAL
Filed Oct. 7, 1959 3 Sheets-Sheet 3

INVENTOR.
DAVID D. CARROLL
BY
ATTORNEYS

United States Patent Office 3,014,309
Patented Dec. 26, 1961

3,014,309
ANIMATED STUFFED ANIMAL
David D. Carroll, P.O. Box 563, Bennettsville, S.C.
Filed Oct. 7, 1959, Ser. No. 844,945
5 Claims. (Cl. 46—135)

This invention relates to a stuffed animal and more particularly to an animated stuffed animal having movable elements to depict various natural movements of the animal.

The instant invention differs from previous improvements in stuffed animals in that it constitutes more than a new visual design or new personality. Moreover, it excels the stiff movements of mechanical devices. The movable parts bring variable action into play so that a child or adult manipulator can create varying animal moods and different degrees of animation, thus reflecting the manipulator's own personality. In general, the improvements represent a distinct advance beyond the undignified, floppy looseness of finger-moving puppetry and yet retain for the animal a naturalness unobtainable through stiff mechanical gears. Finally, the grimaces and gestures achievable through the improved animal are emotionally and amusingly similar to human traits, making the animal a conversational piece and the provider of enjoyment and amusement.

It is, therefore, the primary object of this invention to provide a stuffed animal which, through animated and widely variable movements of component elements, can express animal and human emotions.

Another object of the present invention is to provide a stuffed animal having rotatable eye elements so that they may be moved in concert or separately to express different animal or human moods.

A further object of the present invention is to provide movable ears on a stuffed animal which may be puckered into and out of listening positions expressing universal animal or human emotion.

A still further object of the present invention is to provide a stuffed animal with a slidable tongue and a pivotable tail, each possessed of variable actions denoting different animal and human emotions.

An additional object of the instant invention is to provide a bobbing, turning, ducking and twisting head upon a stuffed animal, controlled with or without movement of other component elements.

Still another object of the present invention is to provide means for moving the various component elements of the animal either individuallly or simultaneously.

Another additional object of the present invention is to provide an animated stuffed animal which is inexpensive to construct, easy to operate and very durable, none of which advantages are found in mechanical assemblies.

Other additional objects and advantages of the present invention will be recognized during a reading of the following description taken in conjunction with the accompanying drawings referred to, wherein:

FIG. 5 is a cross-sectional view taken through the head of the animated stuffed animal adjacent to the rotatable eye elements;

FIG. 6 is a rear elevation view taken along line 6—6 of FIG. 5;

FIG. 7 is a partial cross-section elevational view taken at the rear of the head of the animated stuffed animal of the present invention showing the embodiments of the invention in detail;

Figure 1:
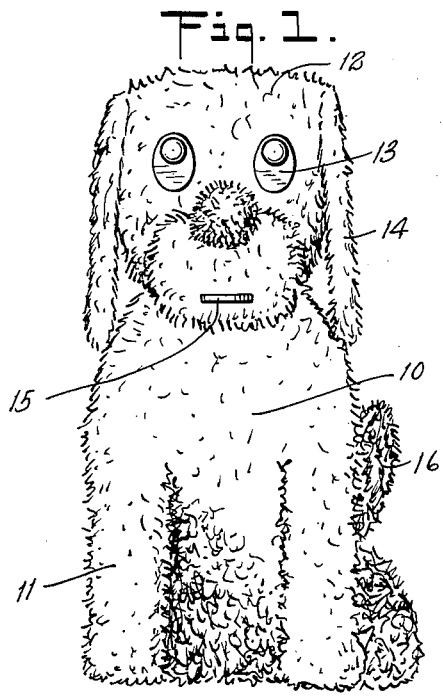
FIG. 1 is a front perspective view of the animated stuffed animal of the invention showing the movable elements in a normal position.

The stuffed animal of the present invention is provided with rotatable eyes, movable ears, tongue, tail and head elements.

Briefly described, the invention comprises improvements to an animated stuffed toy animal having a head, body, legs and tail sections. In the preferred embodiment, the head section is provided with a pair of rotatable tubular elements extending from the front of the head to the rear of the head. The front end of these tubular elements is provided with an oval disc made of plastic or other suitable material and held in place by a dark-colored circular button having a serrated shank which is adapted to be press-fitted into the tubular elements. The disc represents the animal's white eyeball and the dark-colored button represents the round pupil and iris. The rear end of the tube is provided with small handle means held in position by a button also having a serrated shank press-fitted into the tubular elements. Said handle means is so designed as to provide a soft surface for clutching or grasping, and is provided with directional positions keyed to identical positions of the oval plastic disc. The front ends of these two tubular elements are located in an area in the front of the stuffed animal's head where one would normally find the eyes of the animal. These tubular elements are capable of being rotated by the handle means in the back of the head to impart various eye expressions reflecting different moods of the animated stuffed animal and may also suggest human emotional moods.

The animated stuffed animal of this invention is provided with long flexible ears adjacent the top of the head and a second pair of tubular elements extending from underneath the ear to an area centrally disposed in the back of the neck. These tubular elements are provided with grommets so that they will not shift out of alignment and are adapted to guide a thread or cord which is affixed to the inside of the ear and passes through an opening adjacent the top thereof into the tubes and is attached to a pulling member in back of the animal adjacent the ends of the tubes protruding from the neck section. When this pulling member is moved downwardly, the ear sections are constructed to pucker upwardly, thus giving the animal a listening appearance.

The mouth of the animal is provided with a tongue element which may be slidably moved so that the animated stuffed animal may move its tongue in and out of its mouth. This slidable element may also be used to move the head variably. The head of the animal is affixed to the body section in such a manner that by means of the rigid slidable element it may be pivoted in any direction. That is, to the side, forward or backward, etc.

Finally, the tail is provided with a pivotal rod extending from the back of the animal downward into the tail so that it may be wagged in a life-like fashion.

FIGS. 1 through 4 show the basic elements of the animal, wherein the body section is designated by reference numeral 10 which is provided with leg sections 11 and a head section 12. Although the figures simulate a dog in the sitting position, it is understood that the invention of this application may be applied to other animals, such as cats, lions, monkeys, bears or the like and that the animals may be stuffed in a different position, for example, begging, lying or other positions.

The movable features of the animal, which will be hereinafter described, include eye elements 13, flexible ear sections 14, a mouth section 15 and a tail section 16. The animal may be made of any suitable material, such as fur or fur-like plush fabrics, cloth or synthetic materials, and may incorporate different colored sections which are suitably joined by sewing or the like. Any known stuffing may be used. However, it is preferable that the stuffing be of such a nature that it may be forceably blown into the animal. The stuffing should be sufficiently resilient to provide the animal with some definite shape.

The eye elements 13 of the present invention are constructed in such a manner that they may be rotated and thus express various moods of the animal, such as happiness, sorrow, expectation, etc. To provide means for accomplishing the rotation of the eye elements 13, the combination of elements shown in FIG. 5 are preferred.

The fabric covering the front of the head 17 of the stuffed animal and the rear of the head 18 is provided with aligned apertures 19 and 20, respectively. A plastic tube 21 is constructed to extend through the head and cooperate with these apertures. Affixed to the front end of the tube, adjacent the fabric covering 17, is the eye assembly. This assembly comprises an oval shaped resilient section 22 made of plastic, leather, metal or the like and a flat circular button-like section 23. The larger diameter of the oval shaped section should be approximately twice the size of the circular button-like section and may be made by press-stamping a flat sheet of pliable or even rigid plastic. It is preferable that the oval section 22 be colored white and that the circular section 23 be colored black or some dark color to simulate the appearance of an animal's eye. Suitably attached to the back of the flat, round button-like section 23 is a centrally disposed serrated or harpoon shaped shank 24. This shank is constructed to have a maximum thickness between opposed serrated peaks which is slightly larger than the internal diameter of tubular member 21 so that when the shank is forced into tube 21 it will be held there in a fixed position. The serrated points of the shank 24 will dig into the sides of the tube and prevent it from being withdrawn or from shifting out of position.

The resilient oval shaped section 22 of the eye assembly is provided with a vertical slot 25 which will slide well up on the metal shank 24, fitting snugly near the buttonlike section 23. Slot 25 should be disposed slightly above the center of the oval section 22 so that the top of the flat, round eye piece 23 aligns itself slightly below the top of the oval section 22, as shown in FIG. 6. Thus, if the colors are used which were previously described, the circular black or dark eye section 23 is surrounded at its top by a thin band of the white oval section 22 and at its bottom by a larger portion of the oval section 22. However, more of the white is shown below the round eye section 23 since it is mounted off-center on oval section 22.

In assembling these various elements, the oval section 22 is first mounted through shank 24 by sliding the shank through vertical slot 25, and is then pushed justaposition to the back of round button-like section 23. When the shank 24 is pushed through the off-center slot 25 in the oval section 22, the oval eye element 22 will align itself in a fixed position and will rotate when the shank is rotated. The shank of the assembled eye assembly is then pushed into one end of tube 21 until the oval section 22 registers with the end of said tube.

The other end of the tubular member 21, which extends through aperture 20 in the fabric 18 at the back of the head, is provided with a combination of parts which are adapted to rotate said tubular member. The end of the tube 21, which protrudes outside the fabric 18, is provided with a rubber grommet or flange 26. The diameter of this grommet is greater than the diameter of aperture 20 and therefore retains the tubular member 21 in a fixed aligned position and prevents it from being pulled through the aperture 20. Adjacent the grommet 26 and the end of tubular member 21, are handle means for rotating the entire eye assembly. The preferred handle means are shown in FIGS. 5 and 7 which comprise a piece of flexible plastic strip, leather or the like which has pointed or arrowhead shaped ends. This strip may be press-stamped from sheets of flexible plastic, leather, etc. The handle means strip is looped so that the two arrowhead shaped ends 28 register with each other. The arrowhead shaped ends 28 are provided with a vertical slot (not shown) similar to the slot 25 which is found in the oval eye section 22. A thin circular button-like disc 29 having a fixed serrated shank 30 similar to circular eye piece 23 and shank 24 is provided for retaining the handle means in its proper position as hereinafter described.

After the oval eye section 22 and the round eye section 23 are mounted at one end of tube 21 and anchored in place by shank 24, the tube is passed through the aperture 19 in the fabric 17 at the front of the head and pushed out through aperture 20 in the fabric 18 at the back of the head. The grommet or flange 26 is slid over the protruding end of tube 21 until it is juxtaposed the fabric 18. The handle means 27 are slid over shank 30 through the slot provided therefor and constructed to fit snugly upon said shank near the back of the button-like disc 29. The tubular member 21 is then rotated so that the larger part of the exposed section of the oval eye member 22 is in a downward position. The button-like disc 29 and shank 30, on which is mounted the handle means 27, is then inserted into the tubular member 21 so that the handle means 27 have the looped section projecting upwardly and the arowhead end points in the same direction as the long white portion of plastic oval 22.

As shown in FIG. 7, the slot in the arrowhead ends 28 of handle means 27 should be positioned so that the arrowhead section projects downwardly below the button-like disc 29. When mounted in this manner, one can look at the back of the animal's head and know the position and direction of the eyes that are exposed in the front because of this particular aligned mounting. This is shown in FIG. 7 wherein the exposed section of oval 22 on the left eye is downward, and likewise, the arrowhead section below the button-like disc 29 on the right eye is downward. By providing the tubular member 21 with straight lines running longitudinally and inserting shanks 24 and 30 along said lines, the positions of the shanks can be aligned.

The loops of each handle means 27, which are used to rotate the eyes, may be interconnected by a chain 31 or cord, strip or other connector so that the eyes may be moved together simultaneously in various positions. That is, if either plastic handle means is touched at the looped end and moved to the left or right or turned upward or downward, it will drag the other plastic handle means coordinately, producing a coordinated movement of both eyes in the front of the animal's head. The chain 31 should be of a length so that it will permit simultaneous rotation or individual rotation of the eye elements. Chain 31 may be provided with a separating link so that it may be removed if desired thus permitting rotation of each eye element individually. To assist in retaining the tubular elements 21 in their properly spaced relationship, a spacer having prepunched apertures adapted to slide over said tubular members may be provided at the back of the animal's head. This spacer strip may also be used to properly align the tubular elements 21 when being inserted into the head.

Figure 2:
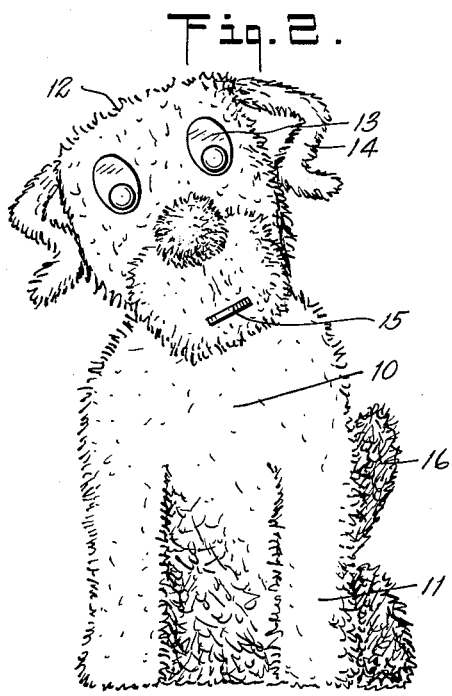
FIG. 2 is a front perspective view of the animated stuffed animal of the present invention showing the movable elements in a different position than that shown in FIG. 1.
Figure 3:
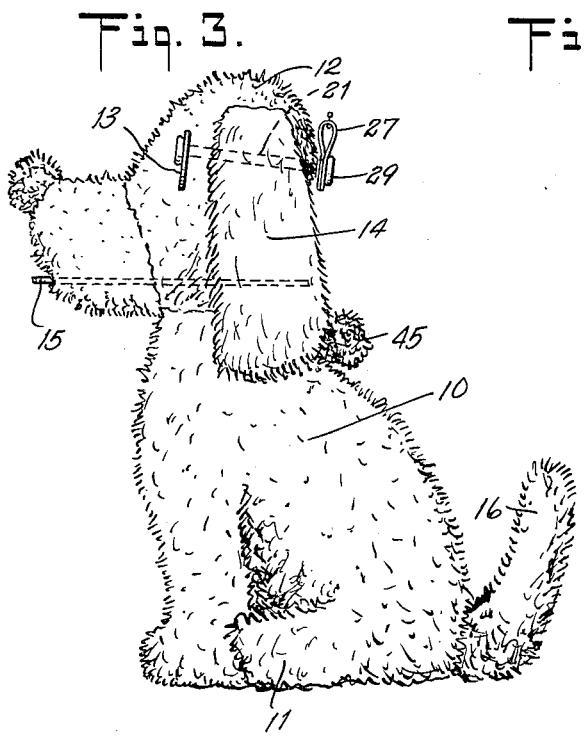
FIG. 3 is a side elevation view of the animated stuffed animal of the present invention.

FIGS. 1 and 2 show two of the many expressions that may be obtained from rotating the eye members. FIG. 1 depicts an animal with a very sad expression on his face, while FIG. 2 shows an animal with an expression of surprise. It can readily be seen that almost an unlimited number of expressions may be obtained and that a flick of the manipulator's finger will produce dramatic changes of expression as visual conversation.

Another feature of the present invention is to provide means for movement of the ear members. The elongated ear members 14 shown in the figures are flexible and preferably do not contain any padding or stuffing. The ears are preferably made by joining two pieces of fabric together at the top and bottom so that a pocket is formed threbetween. The ear members are suitably attached adjacent the top of the head of the animal.

The preferred means provided for moving the ears is shown in the embodiment in FIG. 7 which comprises a pair of plastic or metal tubular members 35 extending internally from an area below the ear adjacent the top of the head to a centrally disposed area in the back of the animal just below the head. The tubular members 35 may be made of resilient plastic, metal or paper and act solely as guide members for a pulling thread or cord as will hereinafter be described.

To properly align the tubular members 35, apertures 36 and 37 are first cut in the fabric. Aperture 36 is located just below the attachment of the ear to the top of the animal's head, while aperture 37 is cut in the fabric at a centrally disposed position in the back of the animal below the head section. The tubular members 35 are provided with grommets or flanges at each end so that they are retained in their proper aligned position and will not pull through the aperture 36. To insert the tubular members 35, a grommet is first slid over one end of the tube. This grommet is larger than apertures 36 and 37. The tube is then inserted into either aperture 36 or 37 and out through the other. The second grommet, which is also larger than said apertures, is then slid over the opposite exposed end of the tube.

A thread 41 is attached at 42 to the inside surface of the ear fabric which is adjacent the head member. As shown in FIG. 7, it is preferable that this attachment 42 be made approximately at a point two-thirds of the way down from the top of the ear. The thread 41 is led through the ear pocket and out through an aperture 44 which is adjacent the top of the ear but below the upper end of tubular members 35. The thread 41 passes through this aperture 44 up, over and into the tubular members 35 and through the opposite end thereof where it is affixed to pulling means. FIG. 7 shows a decorative yarn-made pom-pom 45 as suitable pulling means. The thread 41 may be looped through the pom-pom 45 and pass through the other guide tube and be attached to the other ear in the same manner as previously described, or there may be two separate pulling threads 41 joined at the pulling means 45.

The pulling thread 41 should be of sufficient length so that it will permit the ear members 14 to fall in a normal relaxed position when the pulling member 45 is adjacent the ends of the tubular members in the back of the animal. Tug and release of the pulling means 45 or individual ear cords provides amusing ear movements typical of the animal.

When the pulling member 45 is drawn downwardly, tension is exerted on thread 41 which will draw the flexible ear members upwardly from point 42 where the thread is attached to said ear members. Because of the particular construction of the ear members and the location of the attachment of the thread, the ears will be lifted in a puckered position as shown in FIG. 2. It can readily be seen that when the ears are in this position they simulate an animal's ears in a listening position.

Figure 8:
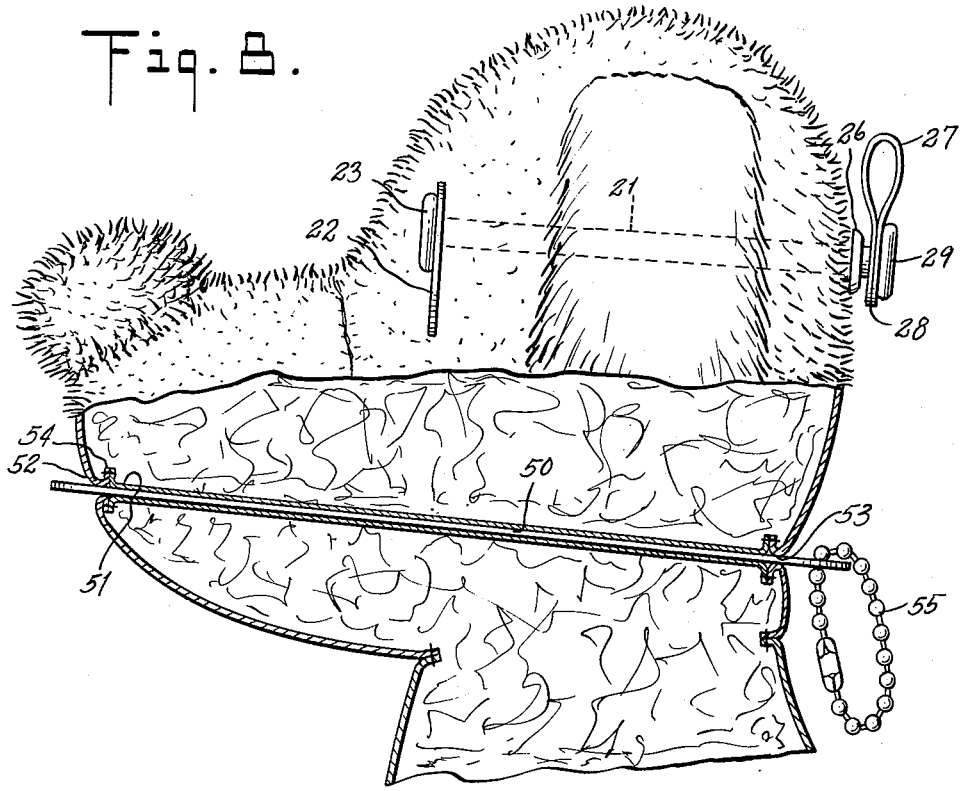
FIG. 8 is a partial cross-section elevational view of the head of the animated stuffed animal of the present invention showing some of the details of the present invention.

The mouth member 15 is constructed to slidably retain a tongue element 50 within a pocket member 51. As shown in FIGS. 7 and 8, the front face of the animal is provided with an aperture 52 centrally disposed in the mouth region and an aligned second aperture 53 centrally disposed in the back of the animal slightly above the neck attachment section. The pocket member 51, made of any suitable fabric and stitched together at its sides, extends from the front aperture 52 to the rear aperture 53. It is suitably attached to the circumferential edges of said apertures by sewing, snapping or the like, as designated by reference numeral 54. The tongue member 50 is made of a rigid material, such as wood, plastic, metal, or the like and has a length greater than the pocket element 51 so that it may be protruded beyond aperture 52. It is preferable that the tongue element be red to simulate the color of an animal's tongue.

To cnoveniently retract the tongue element 50, a chain 55 or the like may be attached to its back end. It can readily be observed that by pushing the back of the tongue element 50 it will protrude through the mouth aperture 52 and simulate a dog extending its tongue. The tongue element may then be easily retracted by pulling on the chain element 55. The tongue element also performs the additional function of pivoting the animal's head as will be hereinafter described.

The head section 12 should be flexibly connected to the body section 10 so that pivotal movement may be imparted to the head section. Flexibility of these two sections may be obtained in a number of ways, such as providing a reduced circumferential area connecting the head and body sections or by providing a specially resilient head and body connector, such as a spiral spring or spine, or by decreasing the amount of stuffing in this area. The resilient tongue member 50 is adapted to be used as a fulcrum for pivoting the head forward, backward or side to side. As previously described, the tongue element 50 is held within the pocket member 51 which retains the tongue within a confined area. Thus, it can be seen that movement of the head may be achieved by the use of one finger guiding the tongue element while the remainder of the fingers can be used to manipulate the other means for simulating animated movements.

Figure 4:
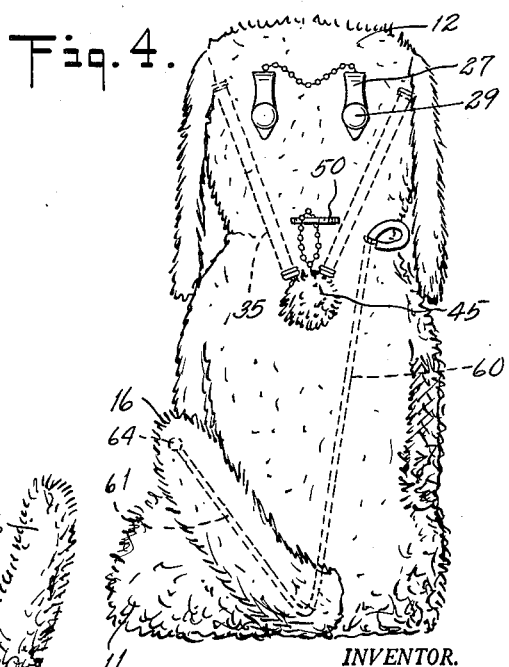
FIG. 4 is a rear elevation view of the animated stuffed animal of the present invention.

The animated stuffed animal of this invention may also include a pivotal tail as shown in FIG. 4. To provide the tail with movement, an interior metal rod 60 having a bent end section 61 extends from the back of the animal adjacent one side of the neck section through the body and up into the tail. The metal rod 60 extends through aperture 62 in the back of the animal and is provided with externally extending looped handle means 63 which may be covered by rubber or the like. The aperture 62 should be adjacent the neck of the animal but off to one side so that it may be moved simultaneously with one finger while other fingers can provide other movements of the animal as will hereinafter be described.

Suitable means may be used for attaching the bent end section 61 of the rod 60 to the end of the tail. The end section 61 may be provided with a rounded or hooked end 64 which can be suitably sewn or fastened to the fabric at the interior tip of the tail. Such a rounded end is preferable because it will prevent the rod from piercing through the tail fabric. It can readily be seen that by pivoting the handle means 63 from one side to the other, movement is imparted through the rod 60 and bent end section 61 to the tail to simulate the wagging of a dog's tail from one side to the other.

Having described the various movable features of the animated stuffed animal of this invention, it can readily be seen that more than one movement may be performed at the same time. It would be possible to shift the expression of the eyes at the same time that movement would be imparted into the ear by the lowering of pull member 45. Likewise, the tail or tongue member could be moved at the same time that the eye members are moved. With these simultaneous movements, it is possible to obtain numberless unique and varied expressions from the animal which would give it a true animated appearance.

Although only the preferred embodiment of the animated stuffed animal of this invention has been described herein, it is understood that certain changes and additions may be made without departing from the spirit and scope of this invention. Certain changes and additions may be made to the various movable features and construction thereof which would simply be a matter of substitution of one known element for another, as metal or fiber tubing for plastic, and molded plastic or metal members to replace the component parts described.

For example, but not by way of limitation, it would also be within the scope of this invention to include a movable wire member in the place of tubular members 35 which would have sufficient resiliency so that it could slide within the stuffing in the head of the animal and lift, depress or otherwise move the ears. It would also be possible to locate the end of the rod member 60 below the ear pulling member 45 and still obtain the functions described in this invention. Likewise, movable wire or woody members in place of tubular members 21 may be welded or fastened onto the eye members and also onto the handle means. The handle means may be formed from wire, wood, plastic or other suitable materials. The cord pulling movement may be substituted for wire in the tail.

Figure 9:
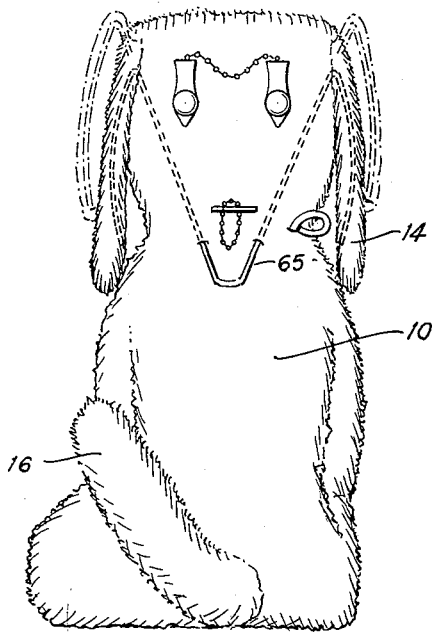
FIG. 9 shows another embodiment of the animated stuffed animal similar to FIG. 4.

The ear members may be provided with a rigid wire member extending from said ears through the animal and outside the back as shown in FIG. 9. The wire member 65, enclosed within the ear, should have a slight inward curvature so that when said wire is moved upwardly, it will move the ears upwardly adjacent the head.

It would also be within the scope of this invention to provide a tubular or shaft member 21 with a fixed eye element 13 which could be snapped onto the end thereof and likewise, a similar arrangement could be provided for the handle rotating means 27. This construction has been found suitable when making the entire eye shaft and rotating means out of a rigid plastic.

It can be seen from the above description that the present invention affords a new and improved animated stuffed animal which incorporates various structural means to provide life-like movements.

I claim:

1. In combination, an animated stuffed animal having head, body, leg and tail sections comprising a pair of eye elements, a pair of rotatable tubular members, said tubular members extending from the front of said head member to the rear of said head member, said eye elements affixed to said tubular members at the front of said head member, handle means affixed to the other end of said tubular members whereby said tubular members may be rotated by said handle means, flexible downwardly extending ear elements, a cord affixed said ear elements adjacent to the bottom thereof and extending upwardly through said ears, means for leading said cord internally from the top of said ear elements to the rear of said body section, exterior pulling means at the back of said body section affixed said ear cords whereby said ear elements may be moved upwardly, a fabric sheath extending from the front of said head section to the rear of said head section, a rigid tongue element, said tongue element adapted to slide in said sheath, an interior pivotal rod, one end of said rod having exterior handle means at the upper area of said body section, the other end of said rod being affixed said tail section element whereby said tail may be pivoted when said rod is pivoted, said elements provided to coact together to impart various moods of animation to said animal.

2. In combination, an animated stuffed animal having head, body and leg sections and provided with various features that coact together to impart various moods of animation to said animal comprising rotatable eye members, a pair of horizontal tubular elements, said tubular elements extending through said head section, said eye members affixed said tubular elements at the front of said head section, cooperating handle means affixed the other end of said tubular elements whereby said eye members may be concurrently rotated, flexible downwardly extending ear members, pulling means affixed the inside of said ears adjacent the bottom thereof and extending through said head section adjacent the top thereof and protruding through the back of said body section, said pulling means adapted to raise said ears in a puckered position, a tongue pocket member extending from the front to the back of said head section provided with apertures at the end thereof, a rigid tongue element adapted to slide within said pocket member and through said apertures, a pivotal tail section, said tail section provided with a rod, said rod extending from inside said tail section through said body section, handle means adjacent the back of said body section for pivoting said rod.

3. An animated stuffed animal having head, body, leg and tail sections, provided with various features that coact together to impart various moods of animation to said animal comprising a head section provided with a pair of rotatable interior tubular elements extending from the front of the head to the rear of the head, a circular button provided with a serrated shank, an oval plastic element cooperating with said shank, an adjacent said button, said shank press-fitted in the front ends of each of said tubular elements, a second pair of buttons each having serrated shanks, a looped piece of plastic cooperating with said second serrated shank and adjacent said buttons, said second serrated shank press-fitted in the back ends of each of said tubular elements thereby retaining said tubular elements in a fixed rotatable position, a chain connecting each of said looped pieces of plastic whereby said tubular elements may be rotated concurrently, said animal provided with elongated flexible ears adjacent the top of said head section, a second pair of interior tubular elements extending from an area below said ears to the rear of said body section, the ends of said second tubular elements provided with exterior washers whereby said tubular elements are retained in a fixed position, a thread affixed the interior of said ears and adjacent the ends thereof and extending through said ears and into said second set of tubular elements, a pull puff interconnecting said thread at the rear of said body section whereby said ears may be puckered by pulling said pull puff, a fabric sheath extending from the front of said head section adjacent the mouth area to the rear of said head section, a flat firm tongue element adapted to slide in said sheath and extend beyond said head section, the rear of said tongue element provided with a chain to move said tongue element in said sheath, an interior metal rod extending from the back of said body section into said tail section, the end of said rod in said tail section being affixed thereto, the end of said rod in said back section provided with an exteriorly protruding handle section whereby said rod may be pivoted thereby pivoting said tail.

4. In combination, an animated stuffed animal having body and leg sections, a pivotal head section affixed said body section, said head section provided with rotatable eye members comprising a tubular element having an oval disc and button affixed one end and handle means and a button affixed the other end, flexible downwardly extending ear members, the inside of said ear members provided with an inwardly curved rigid wire element, said wire element extending in said head section and through the back thereof, said head section provided with apertures in the front and rear thereof, a substantially horizontal tongue pocket element in said head cooperating with said apertures, a rigid elongated tongue member adapted to slide in said pocket element, a pivotal tail member, means extending from said tail member to the back of said body section whereby said tail member may be pivoted from side to side, said members provided to coact together to impart various moods of animation to said animal.

5. In combination, an animated stuffed animal having body, leg, pivotal head and tail sections and provided with features that coact together to impart various moods of animation to said animal, said head section having rotatable eye elements comprising oval sections and superimposed circular sections, a pair of shafts extending through said head section, said oval and circular sections affixed the front end of said shafts, handle means adapted to rotate said shafts affixed the back end thereof, said head section provided with aligned mouth apertures in the front and back thereof, a mouth pocket element cooperating with said apertures, an elongated rigid tongue element adapted to slide in and out of said pocket element, a pair of flexible downwardly extending ear elements affixed said head element adjacent the top thereof, the bottom of said ear elements provided with a pull cord, said pull cord extending through said ear elements to the top thereof, pull cord guide means provided in said head element, said guide means extending from adjacent said ear to the back of said body section, said pull cord cooperating with said guide means whereby said ear elements pucker when said cord is pulled, a rigid rod having one end in said pivotal tail section and the other end protruding from the back of said body section.

References Cited in the file of this patent
UNITED STATES PATENTS

| | | |
|---|---|---|
| 837,216 | Gilbert | Nov. 27, 1906 |
| 921,364 | Clark | May 11, 1909 |
| 2,453,646 | Tomlin et al. | Nov. 9, 1948 |
| 2,496,152 | Dvorak | Jan. 31, 1950 |
| 2,779,132 | Glass | Jan. 29, 1957 |